United States Patent Office 3,816,479
Patented June 11, 1974

3,816,479
PROCESS FOR THE PRODUCTION OF GLYCIDE
Axel Kleemann, and Gerd Schreyer, Grossauheim, and Otto Weiberg, Neu-Isenburg, Germany, assignors to Deutsche Gold- und Silber-Scheideanstalt vormals Roessler, Frankfurt am Main, Germany
No Drawing. Filed Apr. 27, 1972, Ser. No. 248,047
Claims priority, application Germany, May 14, 1971,
P 21 23 930.5
Int. Cl. C07d 1/18
U.S. Cl. 260—348.5 L      10 Claims

ABSTRACT OF THE DISCLOSURE

Glycide is prepared by reacting allyl alcohol with a pure aqueous solution of a 2 to 5 carbon atom percarboxylic acid at a temperature of 0 to 45° C.

---

It is known to produce glycerine by reaction of allyl alcohol with hydrogen peroxide or compounds which form hydrogen peroxide. Extremely long reaction times are required so that in the industrial carrying out of the process there must be employed catalysts, above all tungsten trioxide or tungstic acid. By the use of neutral tungstates as the catalyst, there can be obtained glycide as the main product, see German published application 1,816,060. The recovery of these expensive catalysts in a form useful for the reaction, however, is difficult and is a burden on the entire process.

Furthermore considerable losses occur in the isolation of pure glycide from the dilute aqueous solution. Additionally undesired byproducts are obtained, especially acrolein, which in turn results in starting yield reducing secondary reactions, see Skinner U.S. Pat. 2,862,978, note particularly column 3, lines 14–45.

It is also known to produce glycerine directly by the reaction of allyl alcohol with peracetic acid in aqueous medium. In German Pat. 1,222,028, for example, there is described such a process in which allyl alcohol is reacted with peracetic acid in an acetic acid containing aqueous medium at a temperature of 30 to 90° C. to produce glycerine. This reaction is also disclosed in German published application 1,568,660. The formation of glycide as an intermediate product of this "hydroxylation" is of course known and obvious. However, there were always observed only very low yields of glycide. The crude glycerine resulting must—depending on the simultaneously formed byproducts (acetic acid esters of glycerine)—be purified in expensive manners. Besides losses of glycerine occur thereby. It is desirable therefore not to produce glycerine directly but to produce the intermediate product glycide and, after separation, to hydrolyze this directly to glycerine. In this manner there are eliminated additional substantial purification measures.

The production of glycide from allyl alcohol and peracetic acid likewise is known. In such processes, however, great importance is placed on the reaction mixture being as free of water as possible, see Austrian Pat. 281,-781 and Belgian Pat. 692,370 cited therein wherein organic solvents are employed. According to Austrian Pat. 281,-781 the reaction of allyl alcohol with peracetic acid takes place in the distillation zone of a vacuum column, employing nearly stoichiometrical proportions of the reactants. Peracetic acid is added in the form of a 5–40% solution in a substantially water free, inert organic solvent. According to British Pat. 1,153,971 the presence of water in the reaction mixture must be avoided under all circumstances, since otherwise the hydrolysis of glycerine occurs and the yield of glycide is reduced. This fact is especially emphasized in German published application 1,568,660 according to which glycerine is produced from an acetone solution of peracetic acid and an aqueous solution of allyl alcohol at 20–110° C. According to this procedure the glycide formed should be hydrolyzed to glycerine immediately after its formation.

On the other hand it has now been found unexpectedly that glycide can be produced in high yields at economically favorable speeds of epoxidation in the presence of water if allyl alcohol is epoxidized with pure aqueous solutions of percarboxylic acids having 2 to 5 carbon atoms at temperatures between 0 and 45° C., preferably between 10 and 35° C. The reaction is preferably carried out at normal pressure. However, there can be used reduced pressure, e.g. as low as 30 torr. Super atmospheric pressure can also be used. The allyl alcohol can be employed as such or in the form of an aqueous solution containing up to 30 weight percent of water.

As percarboxylic acids there can be used for example peralkanoic acids including peracetic acid, perpropionic acid, perbutyric acid, perisobutyric acid, pervaleric acid and perisovaleric acid, especially in the form of these aqueous solutions as they are produced according to the processes of German Pats. 1,165,576 and 1,170,926. The entire disclosure of these two German patents is hereby incorporated by reference. These aqueous percarboxylic acid solutions besides have the great advantage that they are substantially safer to use in comparison to solutions of peracetic acid in organic solvents in regard to their explosive properties. They are also simpler to handle industrially. The aqueous percarboxylic acid solutions generally contain 30 to 80% of water.

Essential to the process of the invention are the relatively low reaction temperatures of 0 to 45° C., preferably 10 to 35° C. By this means only a small loss of active oxygen of the percarboxylic acid occurs. Besides the reaction is safe and proceeds, however, with economically favorable reaction speeds. Furthermore only very small amounts of byproducts result. The reaction times employed are between about 0.5 and about 12 hours according to the conditions used.

In the industrial carrying out of the process the reaction can progress at a variety of temperatures while the reactants are distributed in several cascades of vessels with stirrers or reactors in rotation operated for example at 20, 25 and 30° C. In this manner there results a saving of cooling liquid for the entire exothermic reaction since the cooling liquid for the first reactor can be used for the cooling of the second reactor and so forth. However, the reaction can be operated in a single step without difficulty.

The reactants allyl alcohol and the percarboxylic acid, e.g. peracetic acid, can be used in the molar proportions of from 1.5:1 to 10:1, preferably in the molar proportions of 3:1 to 5:1.

The process can be carried out either continuously or batchwise. The yields of glycide generally are above 80% of theory. Yields of 90% of theory and higher can be attained without further steps.

The technical advantage of the process of the invention is in an extrordinary simplification of the entire industrial process for recovery of glycide, why which there is overcome the industrial prejudice, namely the view, that it is not possible to obtain glycide from allyl alcohol and peracetic acid in the presence of water and acetic acid with high yields. By use of non organic solutions of percarboxylic acid the danger of explosion is practically stopped. Additionally there is not introduced a solvent foreign to the reaction and correspondingly need not be again removed. Besides the carboxylic acid formed during the reaction from the corresponding percarboxylic acid can be used again to produce percarboxylic acid and is therefore not a coupled product. Additional amounts of carboxylic acids are not introduced into the reaction mixture by the use of pure aqueous percarboxylic acid solutions. As a result of the high yields of glycide which accumulate besides in very pure condition, the space time yields are also increased in comparison to previous processes.

In order to isolate a pure glycide it is suitable to first quickly separate the lower boiling materials such as allyl alcohol, water and acetic acid, preferably by distillation under reduced pressure at the smallest possible residence time in the column. Subsequently the higher boiling by-products can be separated from the glycide by fractional distillation in a vacuum.

The glycide produced in this manner is a very valuable intermediate for organic synthesis. For example it can be hydrolyzed with water in known manner to form glycerine and reacted with fatty acids to form pure monoglycerides.

Unless otherwise indicated all parts and percentages are by weight.

The invention is further illustrated by the following examples.

EXAMPLE 1

In a period of 3 hours there were dropped into 16 moles (928 grams) of allyl alcohol with good stirring and external cooling 4 moles of peracetic acid in the form of a 59.0 weight percent solution in water and the temperature was held at 25–29° C. The mixture was further stirred at this temperature for one more hour after the end of the addition, at which time the peracetic acid had reacted quantitatively. The reaction mixture contained 18.8 weight percent of glycide, which corresponded to a yield of 91.9% of theory based on the peracetic acid added.

EXAMPLE 2

1 mole of peracetic acid in the form of a 57.4% aqueous solution (altogether 132.5 grams containing 76 grams of peracetic acid and 56.5 grams of water) was dropped into 4 moles (232 grams) of pure allyl alcohol within 1.5 hours with good stirring and held at 35° C. by external cooling. 45 minutes after the end of the dropping in the peracetic acid was 99.8% reacted and the solution contained 17.4 weight percent of glycide. This corresponded to a yield of 84.4% of theory based on the peracetic acid added.

EXAMPLE 3

There were added to 8 moles (464 grams) of pure allyl alcohol with good stirring 1 mole of peracetic acid in the form of a 57.4% aqueous solution within 2.0 hours and the temperature was held at 5° C. (cooling was done with ice water). After a further 11.5 hours at this temperature the peracetic acid was completely reacted and the solution contained 10.82 weight percent of glycide. This corresponded to a yield of 87.1% of theory based on the peracetic acid added.

EXAMPLE 4

There were added to 332 grams of a 70 weight percent aqueous allyl alcohol (4 moles of allyl alcohol) in the course of 1 hour 137 grams of a 55.45 weight percent solution of peracetic acid in water (corresponding to 1.0 mole of peracetic acid) at a temperature of 25–27° C. After a further 2 hours at this temperature the peracetic acid was reacted quantitatively and the reaction mixture contained 13.45 weight percent of glycide. This corresponded to a yield of 85.1% of theory based on the peracetic acid added.

EXAMPLE 5

In a cascade of three reaction vessels each containing 400 ml. and provided with external cooling allyl alcohol was epoxidized continuously with peracetic acid. On the average there were added to the apparatus hourly 0.96 moles of aqueous peracetic acid (123.5 grams of a 59.0 weight percent solution of peracetic acid in water) and 4.20 moles of pure allyl alcohol (244 grams). The temperatures of the three reactors in succession were 2, 26 and 29° C. The peracetic acid free reaction mixture withdrawn from the third reactor contained on the average 17.9 weight percent glycide, which corresponded to a yield of 92.7% of theory based on the peracetic acid added. The reaction mixture without further intermediate handling was sent to the lower part of a distillation column which was set up on a thin layer evaporator and a mixture of allyl alcohol, water and acetic acid drawn off as a head product a t a head pressure of 30 torr. Below the feed point of the column on the average there were drawn off hourly in vapor form 69.1 grams of glycide which still contained 6.2% acetic acid. By immediately subsequent fractionation in a second vacuum column (14 torr head pressure) there were obtained hourly 63.8 grams of glycide having a purity of over 99% (drawn off on the side in the vapor form) so that there resulted a pure yield of 89.8% of theory.

EXAMPLE 6

There were dropped into 232 grams of pure allyl alcohol at a temperature of 25° C. (maintained by external cooling) 184 grams of a 49.0 weight percent solution of perpropionic acid in water within 1 hour. The mixture was stirred further for 2.5 hours at this temperature at which time no more perpropionic acid could be detected in the solution. The reaction mixture contained 16.0 weight percent of glycide which corresponded to a yield of 89.9% of theory based on the perpropionic acid.

The glycide can be formed by a process consisting essentially of adding a mixture of a pure aqueous solution of a peralkanoic acid having 2 to 5 carbon atoms to allyl alcohol and carrying out the reaction at 0 to 45° C.; the reaction being carried out in a mixture consisting essentially of water, allyl alcohol, the peralkanoic acid and the products of the reaction to the extent that they are formed.

What is claimed is:

1. A continuous process for the production of glycide consisting essentially of continuously adding (1) a pure aqueous solution of peralkanoic acid having 2 to 5 carbon atoms and (2) allyl alcohol to the first of a cascade of several reaction vessels, said aqueous solution containing 30 to 80% water, said allyl alcohol containing 0 to 30% water, the mole ratio of allyl alcohol to peralkanoic acid being from 1.5:1 to 10:1, said reaction being carried out in a mixture consisting essentially of water, allyl alcohol, the peralkanoic acid and the products of the reaction to the extent that they are formed, said reaction being carried out at a temperature of 0 to 45° C., the temperature increasing progressively from the first to the last of the reaction vessels, and continuously passing the reaction mixture to each successive reaction vessel in the several reaction vessels.

2. A process according to claim 1 wherein there are three reaction vessels in series.

3. A process according to claim 1 wherein the reaction mixture withdrawn from the last reaction vessel is subjected to distillation under reduced pressure to quickly remove the lower boiling materials including unreacted allyl alcohol, water and acetic acid formed in the reaction as the head product and removing glycide as a vapor below the feed point in the distillation column.

4. A process according to claim 3 comprising subjecting the vaporous glycide product to a fractional distillation in a vacuum to separate it from higher boiling by-products.

5. A process according to claim 1 wherein the reaction is carried out at a temperature of 10 to 35° C.

6. A process according to claim 1 wherein the peralkanoic acid is peracetic acid or perpropionic acid.

7. A process according to claim 6 wherein the peralkanoic acid is peracetic acid.

8. A process according to claim 6 wherein the peralkanoic acid is perpropionic acid.

9. A process according to claim 1 wherein the mole ratio of allyl alcohol to peralkanoic acid is from 3:1 to 5:1.

10. A process according to claim 1, wherein the reaction is carried out for 0.5 to 12 hours.

References Cited

UNITED STATES PATENTS 2,692,271 10/1954 Greenspan et al. __ 260—348.5 L
3,341,556 9/1967 Stautzenberger et al. _____ 260—348.5 L

FOREIGN PATENTS 1,509,277 12/1967 France.
1,942,557 3/1971 Germany.
1,165,576 3/1964 Germany.
1,170,926 5/1964 Germany.

NORMA S. MILESTONE, Primary Examiner